UNITED STATES PATENT OFFICE.

CONRAD SCHRAUBE AND EUGEN ROMIG, OF LUDWIGSHAFEN, GERMANY, ASSIGNORS TO THE BADISCHE ANILIN AND SODA FABRIK, OF SAME PLACE.

VIOLET-RED DYE.

SPECIFICATION forming part of Letters Patent No. 524,222, dated August 7, 1894.

Application filed July 29, 1893. Serial No. 481,871. (Specimens.)

*To all whom it may concern:*

Be it known that we, CONRAD SCHRAUBE and EUGEN ROMIG, doctors of philosophy, both subjects of the King of Prussia, residing at Ludwigshafen-on-the-Rhine, in the Kingdom of Bavaria and Empire of Germany, have invented new and useful Improvements in the Manufacture of a New Violet-Red Dye-Stuff, of which the following is a specification.

In the Letters Patent No. 430,975 granted to Conrad Schraube June 20, 1890, there is described a disulfoacid of the red basic naphthalene coloring matter then known as rosindulin but which since received the name of phenylrosindulin. The said disulfoacid is widely applied in the dyeing industry.

Our present invention consists in a further development of that described in the Letters Patent No. 430,975 above referred to and relates to the manufacture of a new variety of the dye described in said patent which resembles it in its generic characteristics and its valuable dyeing properties but yields a violet red color so that by the aid of our new dye the dyer is enabled to obtain new effects hitherto impossible to attain without the use of a mixed dye.

The process for the manufacture of the new dye consists in condensing ortho-amido-diphenylamine-para-sulfo acid

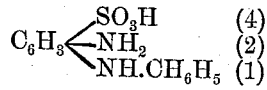

with hydroxy-naphtho-quinone anil $C_1OH_5O$ (OH) ($NC_6H_5$) whereby a new phenyl-rosinduline-mono sulfoacid is obtained and this is converted into the new dye by introducing a second sulfo group by treatment with concentrated sulfuric acid, or this second sulfo group can be introduced by using hydroxy-naphtho-quinone-anil-sulfo acid instead of hydroxy-naphtho-quinone-anil in the first condensation.

The new monosulfoacid above mentioned is not claimed in this present application for a patent but forms the subject matter of a separate application filed July 29, 1893, Serial No. 481,870.

The following examples will illustrate the manner in which our invention can be carried into practical effect and our new dye obtained. The parts are by weight.

*Example 1. Production of the new dye in two steps.*

(a.) Manufacture of the new phenyl-rosinduline mono-sulfoacid. Mix together about eleven (11) parts of the aforesaid ortho-amido-diphenyl-amine-para-sulfoacid, about ten (10) parts of beta-hydroxy-naphthoquinone-anil, about two hundred (200) parts of alcohol and about one hundred (100) parts of water. Boil the mixture, while stirring well. The hydroxy-naphthoquinone-anil disappears as the reaction advances and the new induline sulfo acid separates out as a heavy crystalline powder. The reaction is complete when a hot weakly alkaline solution of the precipitate is completely reprecipitated by the addition of a slight excess of alkali and the mother liquor is not colored yellowish-red by the presence of unchanged naphthoquinone-anil. When this te t is satisfied, collect, press and dry the precipitate.

(b.) Introduction of a second sulfo group by sulfonating the new mono-sulfoacid of phenyl-rosinduline. Stir about ten (10) parts of phenyl-rosinduline-mono-sulfoacid into about forty (40) parts of concentrated sulfuric acid containing about ninety-five (95) per cent. of real sulfuric acid ($H_2SO_4$). Heat the mixture to about one hundred degrees centigrade (100° C.), till a test portion is soluble in about fifty (50) times the quantity of water. To isolate the sulfo acid soluble in water so obtained pour the whole melt, when cold, into about four hundred (400) parts of ice. The sulfo acid is but slightly soluble in dilute sulfuric acid and therefore separates out. Collect and press. Dissolve the press-cakes in boiling water adding alkali and precipitate the dye from the boiling solution by adding common salt. Filter, press and dry.

*Example 2. Production of the new dye in one step.*—Mix together about ten (10) parts of the hydroxy-naphtho-quinone-anil-sulfo acid (see English Patent No. 10,138 of 1892), about eight and a half (8½) parts of ortho-amido-diphenylamine-para-sulfo acid and add one hundred (100) parts of water. Boil the mixture, a deep red solution results. To ascertain when the boiling may be interrupted, take tests from time to time and work them up in the manner hereinafter described for the whole product, when no increase in the quantity of dye precipitated by caustic soda can be noticed in successive tests, the reaction may be regarded as complete. This point being arrived at, work up and isolate the dye from the whole product. To effect this add caustic soda solution (containing say about thirty-five per cent. (35%) NaOH) to the hot solution in such quantity, that the maximum precipitation of the sodium salt of the dye is obtained and a further addition causes no further precipitate. Allow to cool, separate the precipitate from the mother liquor, which should be of a brown, yellow color, and press. To purify the dye, dissolve the press-cakes in hot water and precipitate with caustic soda.

The new die whether obtained in the one step or after previous separation of the mono sulfo acid, is practically if not absolutely identical. It is chemically as aforesaid a disulfoacid of phenyl rosindulin and in the free state possesses the formula $C_{28}H_{17}N_3(SO_3H_2)$ but it differs in its chemical constitution from the isomeric disulfoacid described by Conrad Schraube in Letters Patent No. 430,975 in that its sulfo groups are differently arranged in the molecule, one of them being attached to the phenyl residue forming part of the azin nucleus. Our new dye consequently, while possessing the same generic properties as that patented to one of us in the aforesaid patent differs from it in several practical qualities. It occurs in the form of a violet colored crystalline powder and dyes animal fiber from the acid bath giving violet-red shades whereas the dye of the Letters Patent No. 430,975 gives a bright red color. In the form of its alkaline salts (in which form it is also intended to be claimed) it is readily soluble not only in hot water but also in cold water, whereas the dye of Letters Patent No. 430,975 in the form of its alkaline salts described in the said patent is not readily soluble in cold water. On treating an aqueous solution with caustic soda practically no change of color can be noticed. Similarly the addition of a mineral acid causes practically no change of color. It dissolves in concentrated sulfuric acid giving the bright green solution characteristic of phenyl-rosindulin and its sulfo acids.

What we claim as new, and desire to secure by Letters Patent, is—

1. As an article of manufacture the new disulfoacid of phenyl-rosindulin hereinbefore described which can be derived by the sulfonation of the product of condensation obtained from ortho-amido-diphenylamin-para-sulfoacid and hydroxy-naphtho-quinone-anil and which occurs as a violet powder and yields a bright green solution in concentrated sulfuric acid and in the form of its alkaline salts is readily soluble not only in hot water but also in cold water and which dyes animal fiber from the acid bath giving violet red shades.

2. The process for the manufacture of a new disulfoacid of phenyl-rosindulin consisting in heating together ortho-amido-diphenylamine-para-sulfo-acid and beta-hydroxy-naphtho-quinone-anil with water and alcohol and subsequently introducing the second sulfo groups into the monosulfoacid obtained by treatment with concentracted sulfuric acid substantially as hereinbefore described.

3. The process for the manufacture of a new disulfoacid of phenyl-rosindulin consisting in heating together ortho-amido-diphenylamine-para-sulfo-acid and beta-hydroxy-naphtho-quinone-anil-sulfo-acid in aqueous solution substantially as hereinbefore described.

In testimony whereof we have hereunto set our hands in the presence of two subscribing witnesses.

CONRAD SCHRAUBE.
EUGEN ROMIG.

Witnesses:
ERNEST F. EHRHARDT,
ADOLPH REUTLINGER.